United States Patent [19]
Dillard

[11] 3,778,100
[45] Dec. 11, 1973

[54] EXPANDABLE ROOM FOR PORTABLE LIVING QUARTERS

[76] Inventor: Paul A. Dillard, 5722 Chestnut Ave., Littleton, Colo. 80123

[22] Filed: Oct. 22, 1971

[21] Appl. No.: 191,944

[52] U.S. Cl. .................. 296/23 G, 296/26, 52/67
[51] Int. Cl. ............................................ B60p 3/34
[58] Field of Search .............. 296/23 R, 23 MC, 296/23 G, 23 H, 26, 27; 52/66, 67

[56] References Cited
UNITED STATES PATENTS

| | | | |
|---|---|---|---|
| 2,886,856 | 5/1959 | Che | 296/23 R |
| 3,271,065 | 9/1966 | Scuris | 296/23 R |
| 2,484,312 | 10/1949 | Rebours | 296/23 G |
| 3,511,529 | 5/1970 | Cutsinger | 296/23 |
| 3,598,441 | 8/1971 | Damiana | 296/23 |

Primary Examiner—Philip Goodman
Assistant Examiner—John A. Carroll
Attorney—Richard D. Law

[57] ABSTRACT

An expandable room, having folding floors, side walls and roof, folds to a very thin addition when not in use; for living units, attachments for trailers, campers and the like, and when expanded provides additional living space for such units.

15 Claims, 21 Drawing Figures

PATENTED DEC 11 1973

INVENTOR
PAUL A. DILLARD
BY Richard H. Law
ATTORNEY

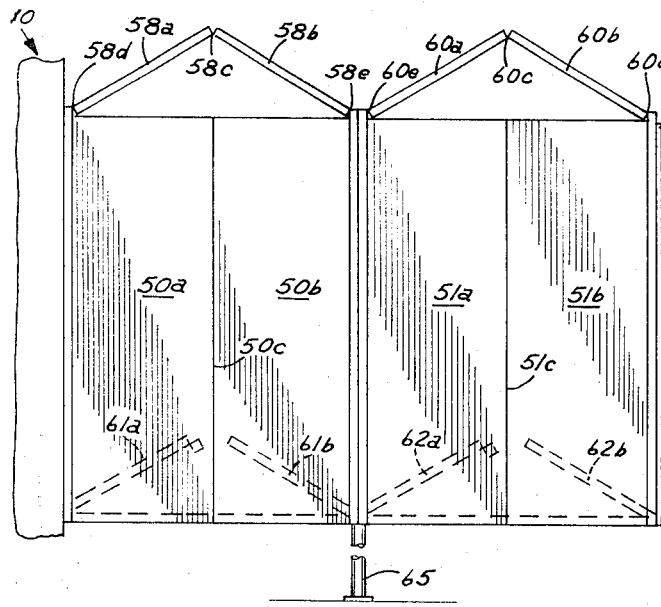
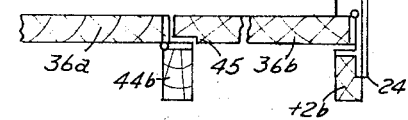
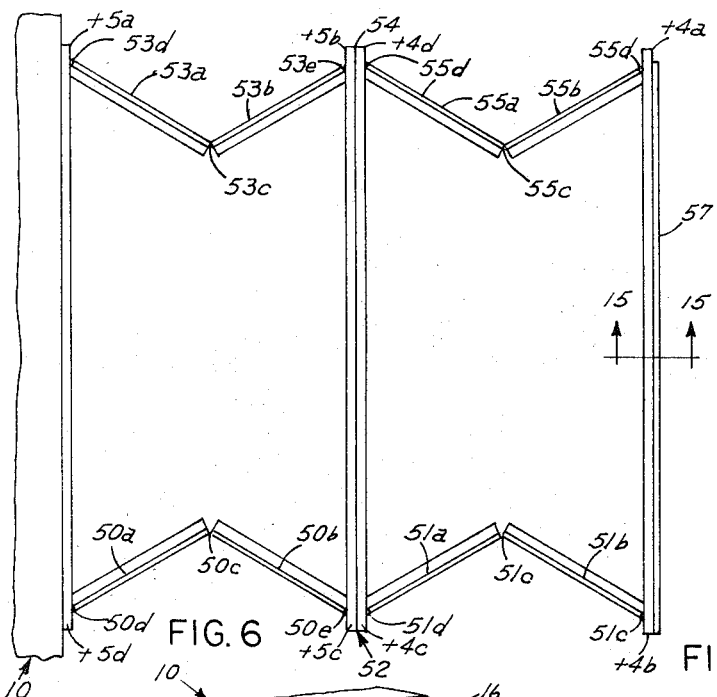
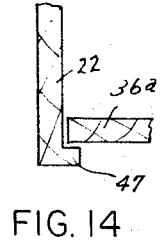
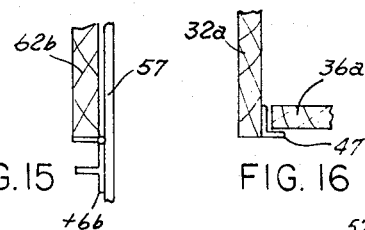
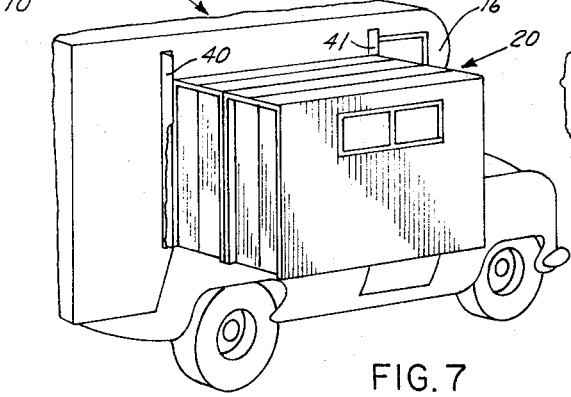
INVENTOR
PAUL A. DILLARD
BY Richard D. Law
ATTORNEY

EXPANDABLE ROOM FOR PORTABLE LIVING QUARTERS

Small, camping trailers and most campers (mountable on pickup trucks or truck chassis) are generally satisfactory for two people. As the number of people increases, the space in such small units is increasingly cramped. In traveling back roads and near-wilderness areas, where the roads are rough and quite narrow, larger living vehicles are not feasible. Heretofore, large families had to compromise accommodations and locations, and when they are used the larger vehicles they could not camp at the out-of-way places with difficult access. When the larger families attempted to use the smaller camping units they were found to be not entirely satisfactory and usually some members of the family had to sleep on the ground away from the unit. The larger living quarter units, also, must necessarily slow down highway travel. Whether the unit is a carried or a towed unit, size determines accessibility to various areas and, also, the type and rate of travel on the highways.

It is, therefore, among the objects and advantages of the present invention to provide an expandable room or rooms for trailers, campers or the like which increases the size of small camping units.

Another object of the invention is to provide an expandable unit which does not increase the traveling size of the camping unit by any significant amount.

A still further object of the invention is to provide a self-supporting expandable room unit for small camping vehicles.

Yet another object of the invention is to provide an expandable room that is attachable to existing living or camping units.

A still further object of the invention is to provide an expandable room for living or camping units which is easily and quickly attachable to an existing unit, and is easily and simply set up for use on the living or camping unit.

Yet another object of the invention is to provide an expandable room for existing living or camping units which permits such units to be used in the same manner as before installation of the room.

These and other objects and advantages of the invention may be readily ascertained by referring to the following description and appended illustrations in which:

FIG. 5 is a side elevational view, generally schematic, of a double expandable unit, according to the invention, illustrating the expandable room in extended position;

FIG. 6 is a top plan view, in section, of the unit of FIG. 5 illustrating the expanding system of the double room of FIG. 5;

FIG. 7 is a partial perspective view of the double expandable room, according to the invention, illustrating the attachment of the unit to the camper;

FIG. 8 is an enlarged detail, generally schematic view, of the roof joint system of the expandable room of the invention;

FIG. 9 is an enlarged detail view of the roof connection of a double expandable room of the invention;

FIG. 10 is a partial, enlarged detail floor joint of folding floor of each section of expandable unit;

FIG. 11 is a detail of a floor connection for an expandable room using a center bracing member;

FIG. 12 is a modified hinged floor support for an expandable room, in enlarged detail;

FIG. 13 is a detail of a further modified roof hinging arrangement, according to the invention;

FIG. 14 is a detail of the joint between a floor section and a wall of an expandable room;

FIG. 15 is a modified hinge arrangement for a floor of a folding room;

FIG. 16 is a modified joint of a floor and wall of a folding room;

FIG. 17 is a detail of a floor section of a double expandable room;

Figure 1:
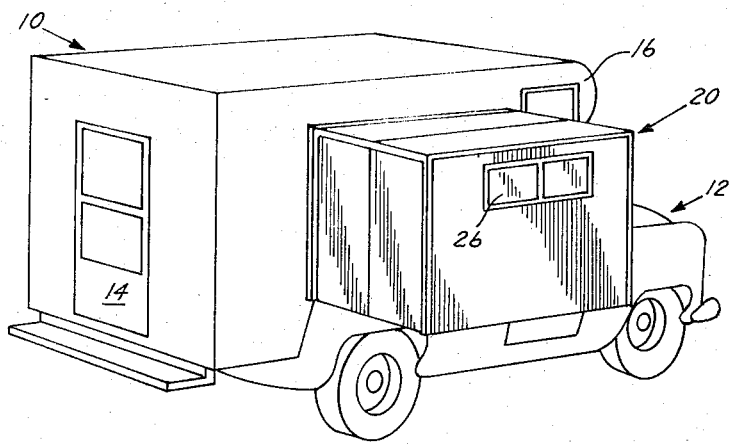
FIG. 1 is a perspective view of a truck-mounted camper unit illustrating an expandable room of the invention attached to the camper and in extended position.

In the device illustrated in FIGS. 1–4, a camper, shown in general by numeral 10, is mounted on a pickup truck, shown in general by numeral 12. The camper is conventional having a rear door 14 for entry and the particular one illustrated includes a cabover 16 which provides additional sleeping room. An expandable room, shown in general by numeral 20, is attached to the right side of the camper and in extended position provides additional room for sleeping, eating, playing, etc., for the camper.

Figure 2:
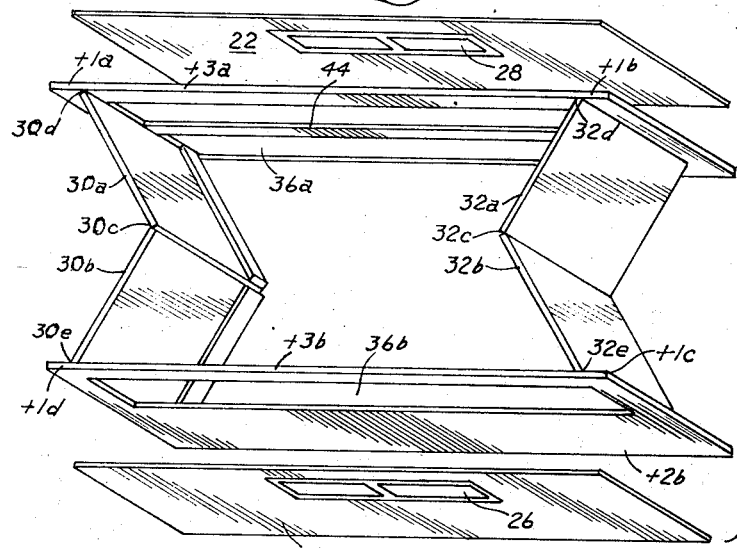
FIG. 2 is an exploded overhead perspective of an expandable room for camping units showing the hinged side walls and floor panels and structure of the unit.
Figure 3:
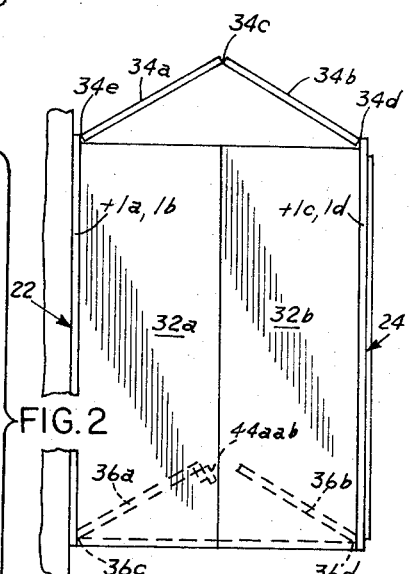
FIG. 3 is a generally schematic view of an expandable room according to the invention showing the means for setting up the unit for use when attached to a camper or trailer.
Figure 18:
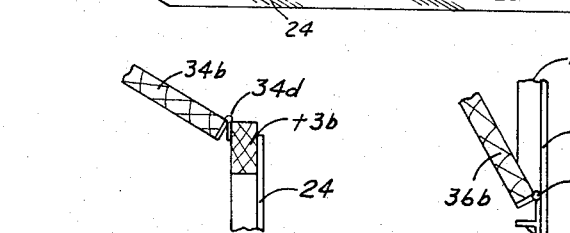
FIG. 18 is a detail of a floor hinge arrangement.
Figure 19:
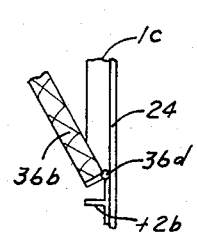
FIG. 19 is a detail of a partially pivoted floor section.

The expandable room, shown in detail in FIG. 2, includes planar structural frame members +1 and +3 which provide mounting surfaces for attaching the unit to the camper wall 22 and receiving the outer wall 24. Frame members +1a, +1b, +3a, etc. form the mounts for the camper. Frame members +1d, +3b, +1c, +2b, etc. provide a frame for outer wall 24. The outer wall has a window 26 (which replaces the normal window of the trailer or camper) while the camper wall with the window 28 removed becomes the inner wall of the unit. Folding side walls 30a and 30b mounted on hinges 30c, d, and e, at one end, and walls 32a and 32b mounted on hinges 32c, d, and e at the opposite end provide means for moving the wall 24 inwardly and outwardly collapsing or expanding the room. By using core walls, the thickness of the closed unit may be maintained at minimum thickness. The folding walls are, also, hinged to the structural frame members at 30d, e and 32d and e. As shown in FIG. 3 the outer wall 24 is arranged to move inwardly and outwardly relative to the camper wall 22 from a closed to an expanded position. The top of the room is arranged to be closed by a folding type ceiling or roof which includes panels 34a and 34b hinged together at 34c and attached to the roof structural frame members +3a and +3b by means of waterproof hinges. A floor is provided for the room by means of hinged floor sections 36a and 36b which are hinged to structural floor joists +2a and +2b at 36c and 36d, respectively, to provide for a folding floor. The floor may be held on side angles, as explained below.

One form of attachment of the unit of the invention is illustrated in FIG. 7, wherein a window on a side of a trailer or a camper is removed and the expandable unit is secured by means of eight or so bolts to the frame of the trailer or camper. Flanges 40 and 41 are mounted on the camper side and placed on either side of the room with the flange extending outwardly from the trailer a sufficient distance to cover the sides of the closed or folded room. Where a single unit is used with walls of approximately five-eights inch thick, the flanges will extend outwardly about three inches, which will completely encompass the sides of the closed unit. Suitcase-type latches (or other suitable latches) may be used to secure the closed room to the flanges. The flanges extend upwardly above the room in expanded position so that when it is folded against the side of a camper unit, the roof panels fold into the flanges and are protected by the flanges. A doorway may be cut in the side of the trailer or camper to permit entry into the side room, or a doorway may be provided into the side room through the side walls or the end wall of the unit. Access may, also, be through the floor panels. Access to the interior of the camper or trailer may be provided through the window opening, after the window has been removed. Thus, the unit may be used with minimum disruption of the inside of the camper or trailer unit itself, but will still provide extra room for the camper or trailer. The illustrations show a single unit attached to one side of a camper or trailer; however, it is obvious that such rooms may be added on both sides of the camper unit when desired. The double unit, therefore, provides rooms on either or both sides of the camper or trailer, and when folded against a camper or trailer will only add about six inches width to each side of the unit. A single expandable room will add about three inches to each side of the unit.

To provide for a self-supporting unit, the foldable room of the invention is provided with side wall rails for supporting the floor. As shown in detail in FIGS. 8 and 9, roof panels 58a and 58b which are hinged to the structural roof joists +9b and +9a, respectively, in a manner to pivot upwardly and downwardly towards each other. For the double unit, roof section 60a hinged on beam +8a, also, pivots. The two mating floor sections are povided with mutual supporting means, and as shown in FIG. 10, an angle 44a supports floor sections 36a and 36b. In FIG. 11, a folding flange beam 44b extending along the edge of a floor panel 36a provides means for supporting the floor panel 36b which is arranged with a slight notch 45 for mating with the support 44b. One or both of the hinged side panels, on each side, may be provided with an angle, or other bracket, for supporting the floor panels when the unit is in extended position. With the arrangement of the floor panel 36a being supported along its sides on the wall panels, the floor section 36b may be held in position by the folding flange 44b. Where desirable, the other half of the foldable side sections may be provided with a similar flange for supporting the other portion of the floor, namely panel 36b.

The hinges for the folding units should be of the solid type or sealed piano hinges, such as plastic hinges which permits folding of the units and will provide a weatherproof joint in closed or open position of the foldable unit. The roof hinges 34c, d, and e should, likewise, be solid type hinges, preferably of the plastic hinge type to provide a weatherproof joint for the roof section itself. Obviously, various types of seals may be provided above the hinge to provide a weatherproof unit.

Where additional space is required, the foldable unit may be made in modular section wherein each module of the approximate size and shape of that shown in FIGS. 1 through 4 may be put together to provide an expandable unit of twice, three or four times the room of the single module. As shown in FIGS. 5 and 6 the double unit is illustrated in partially open position to illustrate the opening and closing of the double unit. In this case a double unit includes side panels 50a, 50b which are hinged together along hinge lines 50c, d and e and panels 51a and 51b hinged along hinge lines 51c, d, and e. Panel 50b and panel 51a are fastened to respective structural frame members +5c and +4c along hinge lines 50e and 51d. The resulting walls are bolted together at the mating line 52 of the frame members forming a double expanding unit. In similar manner side panels 53a and 53b are hinged along hinges 53c, d, and e. The resulting walls are bolted together where the frame members meet 54. An outside wall panel 57 is secured to the frame members +4a, +4b and +6b to provide for the enclosure. In the modular type construction, each modular section has its own roof section hinged at both sides and in the middle for forming the top closure, and in the case shown in FIG. 5 roof panels 58a and 58b are hinged together along line 58c and are, also, hinged at 58d to the roof frame member +9b adjacent the trailer or camper unit, while the panel 58b is hinged to frame member +9a at 58e. The outer unit includes roof panels 60a and 60b, FIG. 5, hinged together at 60c with the panel 60a, also, hinged to frame member +8a, FIG. 9, at the hinge 60e while the panel 60b is hinged along hinge line 60d, FIG. 13, to the outer frame member +8b at 60d. These panels, in open position, lie flat against the side walls and conventional seals may be used for sealing the panels to the side walls and the hinges should provide a weatherproof seal. The floors are made in modular units in a manner similar to the roof, and as shown in FIG. 5 floor panels 61a and 61b are arranged in the manner of the floor panels of FIGS. 1 to 4. These panels are hinged to pivot upwardly and downwardly depending on the location of the unit. Panel 61b is hinged to a beam +7a (FIG. 12) which runs the width of the unit and provides a strengthening member for the walls and for the floors. Floor panels 62a and 62b for the outer modular unit are arranged for closing the outer modular unit. Panel 62a is hinged to the beam +6a while the panel 62b is hinged to the beam +6b. With the double unit a support 65 is necessary to support the beams +7a and +6a which have been bolted together in the joining of the modules to support the outer unit and in some respects the inner unit. A pair of such supports 65 are preferably used at each end of the beam. Additional units may be added on, in which case they are merely added on as modular units with supports for each beam providing support for the room in extended position.

Figure 20:
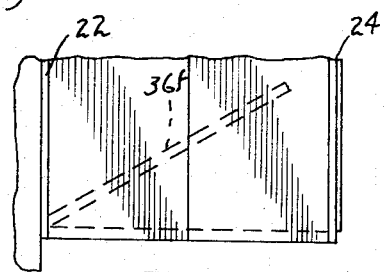
FIG. 20 is a detail of the floor arrangement illustrating the pivotal movemnt of the floor of an expandable room.
Figure 4:
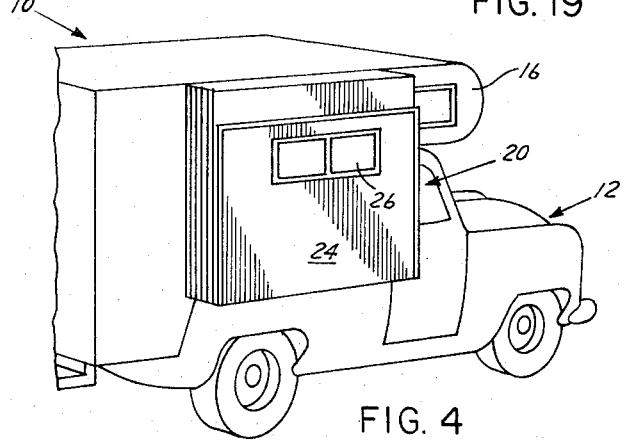
FIG. 4 is a partial perspective view of an expandable room unit according to the invention showing the unit in closed position when mounted on a camper.
Figure 21:
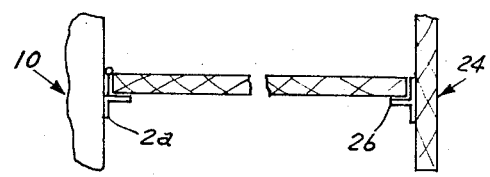
FIG. 21 is a further detail of the pivotal floor arrangement of a foldable room.

Support for the floor section 62b may, also, be a beam +6b (FIG. 15) secured to wall 57. A channel 47 may be used to support the ends of floor sections 36a (FIG. 16). A schematic roof support arrangement is shown in FIG. 17 for a double unit. A single floor panel may be used for a single unit, FIG. 20, where panel 36f pivots downwardly between walls 22 and 24.

With the expandable unit of the invention attached to the camper or trailer as the case may be, it is easily extended into full position by releasing the latches holding it in closed position against the unit, permitting it to move outwardly which permits the side walls to move in a straight line and the roof to come down in the flat position. The floor may then be released with the support floor having the inner edge angle or folding flange beam along its inner edge to be placed down first and the other floor panel then pivoted down on the first floor panel to provide support. The unit is then ready for use. In folding up the unit, the reverse procedure is used where the overlying floor panel is first pivoted upwardly against the wall and the other floor panel then pivoted up against the wall and the unit may then be folded up against the side of the camper or trailer.

I claim:

1. An expandable room module for attachment to an outer wall of a trailer, camper, living unit or the like to provide additional living area to said unit when stationary, said room module comprising:
   a. an inner planar structural frame and an outer planar structural frame;
   b. said inner structural frame includes means for attaching said frame to the outer surface of a wall of the unit and the outer frame is arranged to receive an end wall closure means;
   c. a pair of foldable wall members pivotally attached between each of the corresponding side edges of said structural frames forming a self-supporting module which can be extended from a closed position where the outer structural frame is positioned near the wall of the unit to an open position where the outer frame is extended from the unit;
   d. foldable roof means having a plurality of panels pivotally attached between the upper edges of said structural frames and arranged to fold upwardly into a thin section when the module is retracted from the open to the closed position, said panels being arranged to seal the top of said wall members when in the open position, said roof means and said wall members being arranged to maintain said frames in parallel relation to each other and to the wall of the unit at all times;
   d. foldable floor means arranged to fold inwardly between said structural frames and pivot to close the bottom of said module when extended to the open position; and
   f. said structural frames, wall members, roof and floor means are arranged to fold into a compact, flat assembly against the wall of the unit when in the closed position and means for securing the module to the wall of the unit when in the closed position.

2. An expandable room for trailers, campers and like vehicles according to claim 1 wherein said end wall closure means is one or more additional expandable room modules connected in series, the inner structural frame of one of the additional modules being fixedly attached to the outer surface of the outer structural frame of the unit attached module whereby further additional living area may be provided; and support means attached to an undersurface of one of the additional modules to prevent tipping of said unit.

3. An expandable room module according to claim 1 wherein said foldable wall members each include at least a pair of panels hinged together and to said structural frames.

4. An expandable room module according to claim 1 wherein said foldable roof means includes two panels hinged together and to said structural frames.

5. An expandable room module according to claim 1 wherein said foldable member and means are hinged to said structural frames by solid hinges providing weather proofing.

6. An expandable room module according to claim 1 wherein said end wall closure means includes an opening for communication with the interior of the said room module.

7. An expandable room module according to claim 1 wherein said end wall closure means includes a window.

8. An expandable room module according to claim 1 wherein said attachment means for attaching the inner structural frame to the wall of said unit includes a pair of outwardly extending angles attached to the side of the unit along each side of the frame whereby said expandable room folds to the closed position between said angles for support and protection of the structure.

9. An expandable room according to claim 1 wherein said floor means is a single panel hinged at one edge to a lower edge of one structural frame and includes support means whereby the panel will rest on the opposite structural frame.

10. An expandable room module according to claim 1 wherein said foldable wall members each include two sets of a pair of panels, each pair of panels is hinged to each other and the two sets are hinged together, the outer edges of each set are hinged to said structural frames.

11. An expandable room module according to claim 10 wherein said wall members contain support means for the floor panels when the panels are folded down to expand the room.

12. An expandable room module according to claim 1 wherein said foldable floor means includes at least two separate panels each hinged to a respective structural frame and pivotal toward and away from each other.

13. An expandable room module according to claim 12 wherein one of said panels includes a support flange along the edge opposite the hinge for supporting the free edge of the other said panel.

14. An expandable room module according to claim 1 wherein said wall members include means for supporting the floor means when the room is in the open position.

15. An expandable room module according to claim 14 wherein said structural frames include recesses which receives said support means when the room is in the closed position.

* * * * *

UNITED STATES PATENT OFFICE
CERTIFICATE OF CORRECTION

Patent No. 3778100          Dated December 11, 1973

Inventor(s) Paul A. Dillard

It is certified that error appears in the above-identified patent and that said Letters Patent are hereby corrected as shown below:

Col. 1, line 13 - delete "are"

Col. 2, line 31 - "movemnt" should read --movement--.

Signed and sealed this 16th day of April 1974.

(SEAL)
Attest:

EDWARD M. FLETCHER, JR.          C. MARSHALL DANN
Attesting Officer                Commissioner of Patents